(12) United States Patent
Schulz

(10) Patent No.: US 6,178,872 B1
(45) Date of Patent: Jan. 30, 2001

(54) OPERATING MECHANISM

(75) Inventor: Stefan Schulz, Beutelsbach (DE)

(73) Assignee: Forschungszentrum Karlsruhe GmbH, Karlsruhe (DE)

( * ) Notice: Under 35 U.S.C. 154(b), the term of this patent shall be extended for 0 days.

(21) Appl. No.: 09/236,448

(22) Filed: Jan. 25, 1999

(30) Foreign Application Priority Data

Jul. 24, 1998 (DE) .............................. 198 33 340

(51) Int. Cl.⁷ .............................................. F16J 3/00
(52) U.S. Cl. ........................................................ 92/92
(58) Field of Search ............................ 92/90, 91, 92, 92/64, 137, 76

(56) References Cited

U.S. PATENT DOCUMENTS 4,784,042 * 11/1988 Paynter .................................. 91/534

* cited by examiner

*Primary Examiner*—Edward K. Look
*Assistant Examiner*—Thomas E. Lazo
(74) *Attorney, Agent, or Firm*—Klaus J. Bach

(57) ABSTRACT

In a worm-like operating mechanism including hydraulic or pneumatic actuators arranged around a central axis, the actuators include serially arranged bags disposed in communication with one another and folded meander-like and having fluid passages for supplying fluid under pressure to, or evacuating, the actuators individually, so that the operating mechanism can be lengthened or shortened or bent in any direction.

11 Claims, 2 Drawing Sheets

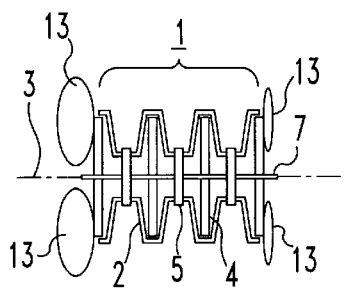
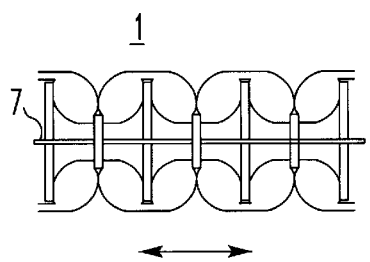
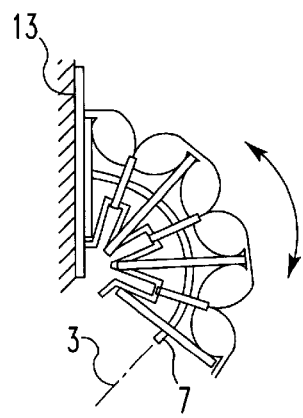
FIG.1a  FIG.1b  FIG.1c
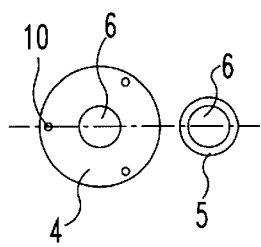
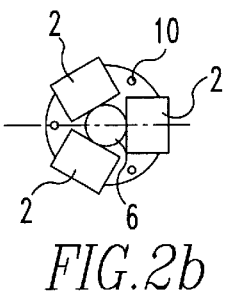
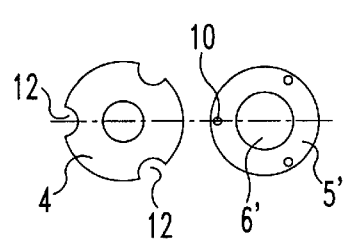
FIG.2a  FIG.2b  FIG.2c
FIG.3a
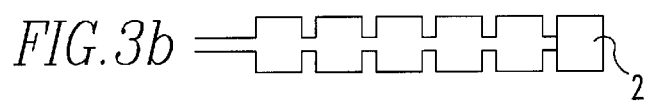
FIG.3b
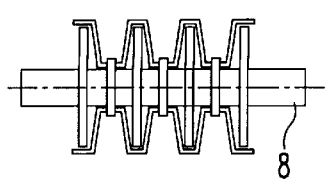
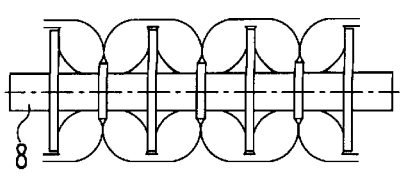
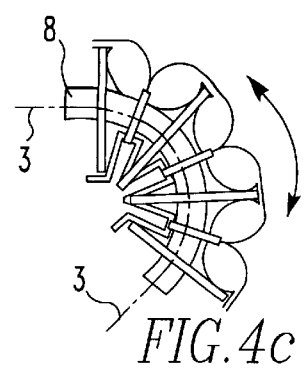
FIG.4a  FIG.4b  FIG.4c

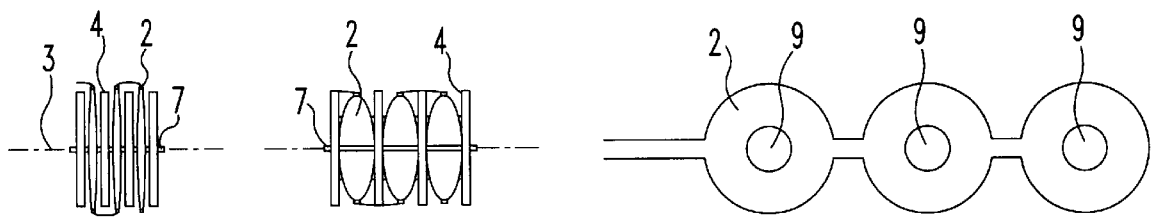
FIG.5a1    FIG.5a2    FIG.5a3
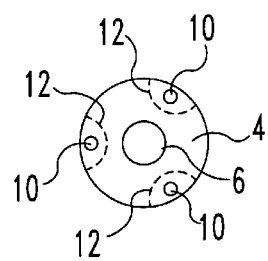
FIG.5b
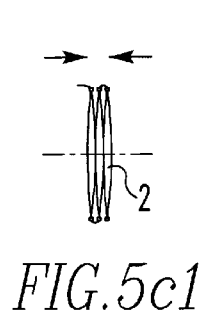 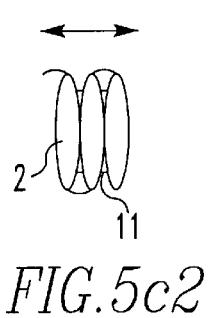 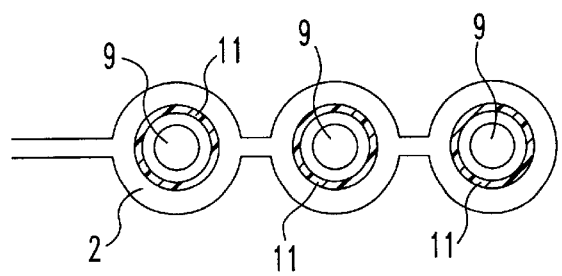
FIG.5c1    FIG.5c2    FIG.5c3

OPERATING MECHANISM

BACKGROUND OF THE INVENTION

The invention resides in a worm-like operating mechanism actuated by pneumatic or hydraulic pressure fluids for lifting, fixing, grasping and moving objects. The mechanism is stretchable and/or pivotable in any direction. It includes pressurized fluid-operated actuators, which automatically return to their rest position when the pressurized fluid is released. Such mechanisms are suitable for forming robot arms, artificial limbs or controllable movable parts for medical instruments.

Operating mechanisms known presently for those applications are relatively complicated and expensive and provide only for limited movability or relatively small force transmission.

DE 39 18 955 A1 discloses mechanism corresponding in principle to a muscle. It includes a balloon-like container consisting of a flexible skin with a pump for pumping a fluid into, or out of, the balloon-like container. The balloon is surrounded by a net, which can be extended lengthwise up to a maximum length at which point the balloon enclosed by the net completely contracted and has no internal volume. When the balloon is filled to its maximum volume the ends of the net are pulled together to a minimum distance. The net then firmly engages the balloon and prevents a destructive further expansion. With this arrangement, a joint-like elbow can be operated, however, movement is limited to one degree of freedom.

Actuators of the artificial muscle type are described in GB 2 240 083 A. They include channel-like elements which can assume any spatial state between a total collapse (zero volume) and a fully expanded state (maximum volume). They include desired fold areas. By filling or emptying the channels the desired volume states can be obtained. By arranging these elements in series, arm- or tentacle-like structures can be formed. The channels are enclosed by, or embedded in, support foils which limit volume expansion.

WO 90/15697 shows plug-like shapes, which can be operated by pressurized fluid such that stretch or bending motions are produced. Channel-like structures are connected for this purpose to other foils such that, upon filling, the whole structure assumes a predetermined shape. The movement of the structure however has only a single degree of freedom starting with a folded limp structure and leading to an expanded taut structure and vice versa.

DE 196 17 852 A1 discloses a method of making fluid operated miniature manipulators employing expandable pocket structures comprising two foils disposed on top of each other. The foils are welded together along a line and include a supply passage for the admission and the discharge of fluid. They can assume any volume between zero and a maximum volume. The various designs illustrated however do not permit any tilting motion either, that is, they have only one degree of freedom.

It is the object of the present invention to provide an operating mechanism for generating spatial tilt and linear movements which mechanism is capable of generating large movements and large forces.

SUMMARY OF THE INVENTION

In a worm-like operating mechanism having hydraulic or pneumatic actuators arranged around a central axis, the actuators include serially arranged bags disposed in connection with one another and being folded meander-like and having fluid passages for supplying fluid under pressure to, or evacuating, the actuators individually, so that the operating mechanism can be lengthened or shortened or bent in any direction.

The actuators may consist of torus-shaped meander-like joined bags which may be held together by retaining and support rings to form the actuating mechanism. The actuators may consist of two foils, which are welded together along a given line selected to provide any desired hose, bag or pocket shape. The shape that can be generated by such attached bags or pockets is highly variable although only simple manufacturing processes are required to achieve that result. The support elements, which are disposed in the actuator folds for containing the bags can be simple rings, which may have a certain elasticity. However, they may also consist of the material of which the support elements are made, which are disposed in the outer folds for maintaining the meander shape and which are relatively stiff. The support rings may be omitted if the adjacent pillows of the respective actuator are interconnected in a point or line-like fashion (cemented or welded) but they may be retained for containing the bags. Also, adjacent bags may be welded or cemented together along a line so that the outer support rings which circumferentially engage the bags at the outer folds can be omitted.

Another actuator design includes a folded hose structure that is, it includes bags joined in series such that bellows structures, not meander-like structures are formed.

To facilitate return movement of the actuators or the whole drive mechanism elastic return elements are utilized. The return elements may be disposed in lumina. They may include a hose or screw springs arranged centrally within, or along the free corner areas between, the actuators, along the discs or through the discs. In this case, there is provided an additional cohesion structure for the operating mechanism.

The operating mechanism further may be anchored at its proximal end. This may be achieved by a flange by which it can be screwed to a support or by a bayonet lock arrangement. In narrow spaces or channels, the drive mechanism may also include pneumatically or hydraulically expandable bags which are arranged in star-like annular form or an annular bag engaging at the proximal end a wall. For stability reasons, two adjacent rings of such bags would be advantageous, but this depends on the intended application.

The operating mechanism can be anchored at one end, but it may also be anchored at the other end if there is such an arrangement also at the distal end, If anchoring arrangements are provided at both ends of the actuating mechanism, a wormor caterpillar-like movement can be obtained. To this end, first only the proximal operating bag is expanded and, pressing against the adjacent wall, the mechanism is lengthened and anchored at the distal end. The proximal bag is then emptied and the mechanism is pulled toward the distal end. For a return movement, the process is reversed. As a result, advance movement in curved channels or pipes is possible.

The operating mechanism can be employed as a lifting apparatus, or used for operating a joint, a grasping or a retaining apparatus and it can be modified for use as a moving mechanism, as a robot arm, or it can be employed in an artificial limb, ssssfor example in an arm, hand, or leg prosthesis. The mechanism can bend in any direction and be returned to a straight position. In addition to the bending movement, an elongation of the operating mechanism can also be achieved.

With the inch worm-like drive mechanism, a basic operating element is provided which provides for high movability with small bending radii and large bending angles. Because of the particular materials needed for its construction, the mechanism is very light-weight, but is capable of generating or transmitting large forces. The design is simple and cost-effective since the materials are inexpensive and their processing for forming the actuators and the assembly of the respective operating mechanism is simple. Inspite of its simplicity, the operating mechanism can easily be adapted to various fields of application. It may be constructed, if necessary, without the use of any metal parts. Because it is easy to manufacture and has wide applications, the mechanism is economical and, because of its capabilities, it is technically very attractive.

The invention will be described below in greater detail on the basis of the accompanying drawings:

BRIEF DESCRIPTION OF THE DRAWINGS

FIG. 1a shows the operating mechanisms in an axially fully folded (retracted) position, FIG. 1b shows the operating mechanism in an axially stretched position, FIG. 1c shows the operating mechanism in a bent position, FIG. 2a shows the support elements of the mechanism, FIG. 2b shows the position of the bags of the three actuators relative to the axis of the operating mechanism, FIG. 2c shows support and retaining discs, FIG. 3a shows an actuator in its geometrically most simple form, FIG. 3b shows an actuator comprising a series of formed bags, FIG. 4a shows an operating mechanism with a central flexible and expandable hose extending through the bag lumen, FIG. 4b shows the arrangement of FIG. 4 with the bags expanded and the operating mechanism and hose stretched, FIG. 4c shows the arrangement of FIG. 4 with the bags expanded only at one side for bending of the operating mechanism, FIG. 5a1 shows the individual bags folded meander-like, FIG. 5a2 shows the arrangement of FIG. 5a1 with the bags expanded, FIG. 5a3 shows the bags laid out to show their arrangement, FIG. 5b shows the support disc used in the arrangement of FIG. 5a1–5a3, FIG. 5c1 shows an actuator with torus-like bags which are joined directly along a circular line, FIG. 5c2 shows the arrangement of FIG. 5c1 with the bags expanded, FIG. 5c3 shows the torus-like bags layed out to show the design,

DESCRIPTION OF PREFERRED EMBODIMENTS

In all the embodiments shown the operating mechanism 1 comprises three actuators 2 of a represistant material arranged in annularly equally spaced relationship around the axis 3 of the mechanism. FIG. 1a shows the mechanism in its shortest state where all three actuators 2 are fully evacuated; the pressure fluid, gas or liquid, is completely removed. In this state, the actuators are compressed by the ambient air pressure because there is no internal pressure exerted by the pressure fluid.

All three actuators 2 are held by the disc-like support elements 4 and the annular retaining elements 5 in a meander-like position. The small ring-like retaining elements 5 are elastic and pull the actuators 2 toward the axis 3. The larger disc-like support elements 4 are more or less stiff, but at least sufficiently stiff to hold the actuators radially apart. The alternate arrangement of the support elements 4 and the retaining elements 5 provides for the meander-like structure of the actuators 2 and forms the lumen 6 (FIG. 2b). The element 7 shown along the axis 3 in heavy lines shows schematically, an elastic return element which aids the return of the actuators upon actuator evacuation.

The support and retaining elements 4 and 5 are shown in FIG. 2a in a simple form in a side view. The large annular disc 4 is sufficiently stiff to support the actuators radially. The central bore 6 is adapted to receive a lumen and to limit its diameter. The smaller retaining element 5 is also stiff since it has to retain one end of the actuator bags, where the actuator bags 2 are pressurized or unfolded to counteract the radial local forces generated by the expansion of the adjacent bags. The retaining element 5 however may also be elastic so that it can yield to some extent when the actuators 2 are expanded and can again retract the bags to their rest positions when the bags are depressurized. Both the support and the retaining elements 4, 5 with their alternate arrangement and the meander-like retained actuators 2 provide the worm-like shape of the operating mechanism. FIG. 2b shows the operating mechanism in a cross-sectional view. The three actuators 2 are distributed, equally spaced, around the axis 3 to form the lumen 6. FIG. 2c shows the support disc 4 with recesses 12 for supporting the actuator bags and the retaining disc 5 including the hole 6, receiving the return mechanism 7.

The most simple arrangement of an actuator 2 is shown in FIG. 3a. In this case, the actuator is a uniform smooth tubular structure with a fluid admission channel at one end thereof (at the left end in the figure). This structure is folded meander-like to form the actuator 2. In this case, however, problems may arise in the fold areas with the filling of the bag sections and particularly with their evacuation as further uncontrolled folds may develop which block the passage of the fluid. An arrangement with preformed bags or pockets as it is shown in FIG. 3b is therefore preferred, particularly with a cylindrical arrangement of the actuators 2. In this arrangement, the fold areas are well defined at any fill state of the bags. The bags, the chambers or the pockets are then arranged in series as desired and press each other apart when pressurized while the meander shape is maintained by the support and retaining elements 4, 5. This is shown in the figure series 1a–1c and 4a–4c for a simple bag shape and in FIGS. 5a–5c for the torus type bags (FIG. 5a1–5a3). If immediately adjacent bags of the actuator 2 are cemented together as indicated by the structure 11 along a line or along points as shown in FIGS. 5c1–5c3, the support disc 4 is omitted. Several of such actuators may be interconnected by a support disc 5.

FIGS. 1a to 1c show the return element 7, which is shown as an elastic rope-like structure which extends through the center of along the worm-like operating mechanism and is anchored to the two end faces. It may also extend through openings 10 or recesses 12 formed in the support and retaining elements 4,5: At least two such return elements are needed to provide uniform return forces. The return forces may also be provided by an elastic hose or a coil spring extending through the lumen and engaging the inner surface of the lumen. FIGS. 4a to 4c show arrangements corresponding to those shown in the FIG. 1a to 1c, wherein a hose 8 is provided as the elastic return element.

The return elements in one or another form are only necessary if an automatic return of the actuator arrangement is not sufficiently strong. The return forces can be increased also by interconnecting adjacent bags (cementing welding) along predetermined lines or points.

The operating mechanism provides for a worm-like movability since the three actuators 2 can be filled and evacuated independently of each other. This provides for the spatial tilting and bending capability and also for stretching. This is shown in FIGS. 1b and 1c and FIGS. 4b and 4c and in order to achieve, the situation shown in FIGS. 1c and, respectively, 4c at least one actuator 2 needs to e filled and, at the same time, another actuator 2 needs to be emptied. By varying the filling state, any intermediate position can be obtained as desired.

In addition to the geometry of the building components of the operating mechanism 1, the number of serially arranged bags of the actuators 2 determines the area of movement and, consequently, the tilting range of the free front end of the actuator mechanism.

If the actuator mechanism needs to be movable within relatively narrow limits, the actuators 2 consist of an easily flexible but not very stretchable material which permits volume changes between zero and a maximum filling degree.

The operating mechanism must be anchored at its proximal end to provide for controllable tilting of the free distal end. This is possible by a mechanical anchoring structure 13 as it is shown for example in FIG. 1c where the proximal end of the actuator mechanism is attached to a base plate or is flanged to the end of a tubular shaft or, for operation in channel-like spaces, to an annular chamber 13 (FIG. 1a) which can be pressurized and evacuated independently of the actuators. Preferably, the anchoring structure comprises a bayonet-type lock. It also may include a plastic material ring with a chamber which can be filed with a pressure fluid to expand the plastic material ring. The annular chamber 13 extends around the proximal area of the actuator mechanism and, when filled engages the channel wall over a relatively large area for anchoring the operating mechanisms to the channel wall. Instead of such an annular chamber 13 a number of circumferentially distributed bags may be provided which can also be pressurized and evacuated. Unevenness of the channel surfaces can be accommodated as long as there are no sharp edges since the pad or bag wall is flexible and adapts to the walls surfaces. Also, such a channel wall does not need to be rigid since the bag-like anchoring structure 13 may be made of a stretchable material in order to bridge different channel diameters (FIG. 1a). For clarity reasons, FIG. 1a, left side, shows only such an anchoring structure. Two axially adjacent anchoring structures may be used for a more stable anchoring.

Another embodiment permitting advancing of the complete anchoring mechanism 1 is shown in FIG. 1a: A bag-like anchoring structure 13 is provided at the proximal and the distal ends of the operating mechanism. At the left side of the figure, the anchoring structure is filled; on the right end, it is emptied. If now the operating mechanism extends to the right and the bags at the right end of the operating mechanism are filled, they engage the adjacent wall and anchor the right end to the channel wall. If then, the left end is emptied and subsequently the actuators 2 are evacuated the left end is pulled toward the right end. In this way, an inchworm-like movement of the operating mechanism in one or the opposite direction is obtained, depending on the sequence in which the anchoring structures 13 and the actuators 2 are filled and evacuated.

What is claimed is:

1. A worm-like operating mechanism including pneumatic or hydraulic actuators by which objects can be lifted, fixed, grasped or moved and which can be tilted in any direction and which further, upon depressurization of the actuators returns automatically to a rest position, said operating mechanism comprising: alternately arranged radially outer support elements and radially inner retaining elements, at least three actuators consisting of a ripresistant flexible pressure tight non-metallic material, each actuator consisting of a packet of serially arranged bags folded radially so as to extend meander-like between said radially outer support elements and said radially inner retaining elements so as to form serially arranged essentially radially extending chambers disposed adjacent to and in communication with one another by channels extending between adjacent bags and each packet of serially arranged bags including fluid passages at the radially outer support- and the radially inner retaining elements for supplying fluid under pressure to said bags or removing said fluid therefrom, said actuators being interconnected in a circular arrangement around a center axis to form a worm-like operating mechanism, said actuators being adapted to be independently filled or evacuated for changing the volumes of said actuators to permit expansion or contraction of the actuators so as to provide for lengthening or shortening or bending of the worm-like operating mechanism.

2. An operating mechanism according to claim 1, wherein each actuator comprises two foils disposed on top of each other and joined pressure-tight along a given path to form a number of chamber structures with a channel structure remaining between adjacent chamber structures.

3. An operating mechanism according to claim 1, wherein said actuator mechanism includes an elastic return structure for returning said actuator mechanism to a rest position when pressure is released from said actuators.

4. An operating mechanism according to claim 3, wherein said elastic return structure extends through said the center of said mechanism and abuts said actuators.

5. An operating mechanism according to claim 3, wherein said elastic return structure extends through recesses formed in said support elements.

6. An operating mechanism according to claim 3, wherein said elastic return structure extends through holes formed in said support elements.

7. An operating mechanism according to claim 3, wherein said return structure comprises elastic rope-like return elements extending through the center of said actuators.

8. An operating mechanism according to claim 1, wherein said operating structure is provided at one end with a first anchoring mechanism for retaining said one end.

9. An operating structure according to claim 8, wherein said anchoring mechanism is a bayonet-type lock.

10. An operating mechanism according to claim 8, wherein said anchoring mechanism includes a plastic material ring with a chamber which can be filled with a pressure fluid to expand said plastic material ring.

11. An operating mechanism according to claim 10, wherein a second anchoring mechanism including a plastic material ring is arranged at the other end of said operating mechanism and said anchoring mechanisms can be pressurized and depressurized independently such that said operating mechanism can move through passages by selectively pressurizing and evacuating said two anchoring mechanisms and said actuators.

* * * * *